(12) United States Patent
Early et al.

(10) Patent No.: US 8,561,633 B2
(45) Date of Patent: Oct. 22, 2013

(54) STEEL-REINFORCED HDPE RAIN HARVESTING SYSTEM

(76) Inventors: Daniel M. Early, New Castle, VA (US); Scott F. Easter, Huddleston, VA (US)

(*) Notice: Subject to any disclaimer, the term of this patent is extended or adjusted under 35 U.S.C. 154(b) by 555 days.

(21) Appl. No.: 12/941,892

(22) Filed: Nov. 8, 2010

(65) Prior Publication Data

US 2012/0111428 A1    May 10, 2012

(51) Int. Cl.
    *B65G 5/00* (2006.01)
(52) U.S. Cl.
    USPC .......... 137/363; 137/236.1; 137/565.11; 405/53; 405/55; 210/170.03; 210/484; 210/489
(58) Field of Classification Search
    USPC ........ 137/236.1, 363, 565.11; 405/37, 53, 54, 405/55; 417/36, 38; 210/170.03, 338, 484, 210/489
    See application file for complete search history.

(56) References Cited

U.S. PATENT DOCUMENTS

| | | | | |
|---|---|---|---|---|
| 3,461,803 A | * | 8/1969 | Johnson et al. | 417/36 |
| 3,715,958 A | * | 2/1973 | Crawford et al. | 52/21 |
| 4,049,013 A | * | 9/1977 | Shenk | 137/263 |
| 4,253,282 A | * | 3/1981 | Swartz | 137/363 |
| 4,275,757 A | * | 6/1981 | Singer | 137/363 |
| 4,348,158 A | * | 9/1982 | Wood | 417/40 |
| 5,343,890 A | * | 9/1994 | Deutch | 137/363 |
| 5,573,677 A | | 11/1996 | Dembrosky | |
| 5,607,075 A | | 3/1997 | Burgdorf et al. | |
| 6,655,402 B1 | | 12/2003 | Fan | |
| 7,025,076 B2 | | 4/2006 | Zimmerman, Jr. et al. | |
| 2008/0023404 A1 | * | 1/2008 | Majersky | 210/683 |
| 2008/0121579 A1 | * | 5/2008 | Dierkes | 210/170.03 |
| 2008/0149188 A1 | | 6/2008 | Zimmerman et al. | |

FOREIGN PATENT DOCUMENTS

| | | |
|---|---|---|
| EP | 1 201 834 A2 | 5/2002 |
| JP | 2002266381 | 9/2002 |

* cited by examiner

*Primary Examiner* — John Fox
*Assistant Examiner* — Kevin Murphy
(74) *Attorney, Agent, or Firm* — Richard C. Litman

(57) ABSTRACT

The steel-reinforced HDPE rain harvesting system collects, stores, and pumps harvested rain water for a variety of non-portable uses. The rain harvesting system includes either a horizontally disposed or vertically disposed steel-reinforced plastic cylindrical wetwell connected to an inlet pipe. The inlet pipe discharges rain water into a rain filter made from a pervious concrete manhole lined with a replaceable 20-micron filter cloth. The rain filter allows rain water into the storage section of the wetwell. A high water alarm is disposed in the rain filter and alerts maintenance personnel to clean the filter when needed. A submersible pump is housed in an HDPE pump sleeve outside the wetwell and conveys effluent from a forcemain at the wetwell's bottom portion to a target area. A level monitoring system disposed inside the wetwell selectively activates the pumping system. Maintenance hatches atop the unit are included.

18 Claims, 5 Drawing Sheets

STEEL-REINFORCED HDPE RAIN HARVESTING SYSTEM

BACKGROUND OF THE INVENTION

1. Field of the Invention

The present invention relates to systems for collecting and recycling rain water, and particularly to a portable steel-reinforced HDPE rain harvesting system having a wetwell made from plastic, preferably high-density polyethylene (HDPE), reinforced with steel.

2. Description of the Related Art

Rain water often goes wasted, either pooling on top of road surfaces and roofs, or running off into streams, rivers, and the like. There is now an emerging trend to capture and use rain water that heretofore had been wasted on such impervious man-made surfaces. The capture and use of rain water attempts to restore a natural hydrologic cycle, which is broken by the aforementioned impervious structures. Systems have been developed and used to mitigate the effects of urbanization on water resources.

For example, systems employing in-ground water storage tanks to capture and hold rain water runoff for later use have been developed. Notwithstanding such systems, there remains a need for low-cost, easily transportable, readily installable liquid-storage tanks having utility for rain water reclamation as a water source for both non-portable and portable uses. Such a storage tank system should also be durable. Thus, a steel-reinforced HDPE rain harvesting system solving the aforementioned problems is desired.

SUMMARY OF THE INVENTION

The steel-reinforced high-density polyethylene (HDPE) rain harvesting system is a portable, pre-assembled apparatus that collects, stores, and pumps harvested rain water for a variety of non-portable (and portable) uses. The rain harvesting system includes either a horizontally disposed or vertically disposed steel-reinforced plastic cylindrical wetwell connected to an inlet pipe. The inlet pipe discharges the water into a rain filter made from a pervious concrete manhole lined with a replaceable 20-micron filter cloth. The rain filter allows rain water into the storage section of the wetwell.

A high water alarm is disposed in the rain filter and alerts maintenance personnel to clean the filter when needed. A submersible pump is housed in an HDPE pump sleeve outside the wetwell and conveys effluent from a forcemain at the wetwell's bottom portion to a target area. A level monitoring system disposed inside the wetwell selectively activates the pumping system. In addition, a high water overflow port is located at the top of the wetwell, which allows gravity discharge of excess rain water from the storage tank to an external location. A slide rail assembly may be included to facilitate the installation and removal of pumps. A water level monitoring system selectively controls pump activation and alarms. Access hatches in the top of the wetwell provide access to the rain filter and level monitoring system components.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
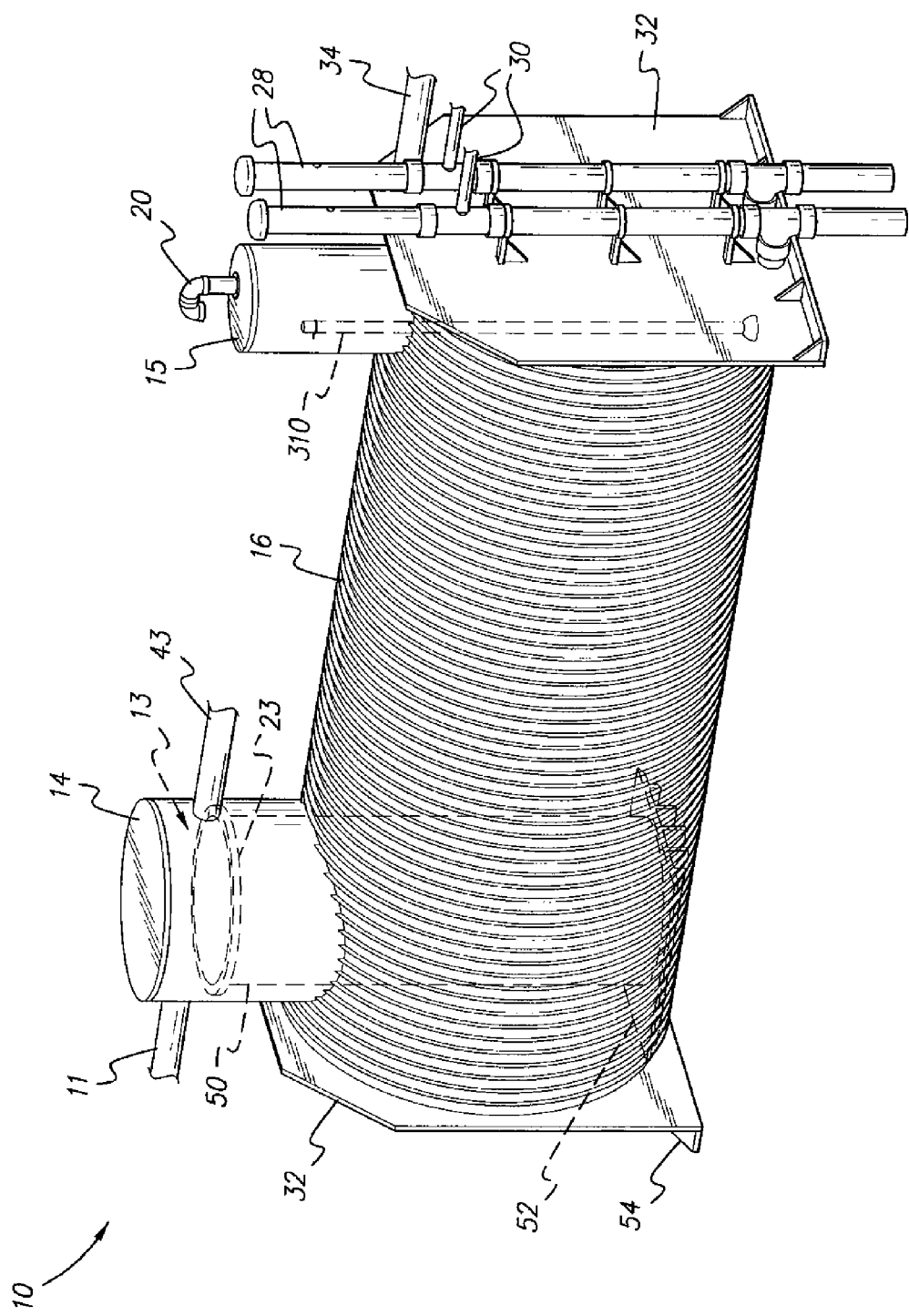
FIG. 1 is a perspective view of a steel-reinforced HDPE rain harvesting system according to the present invention.
Figure 2:
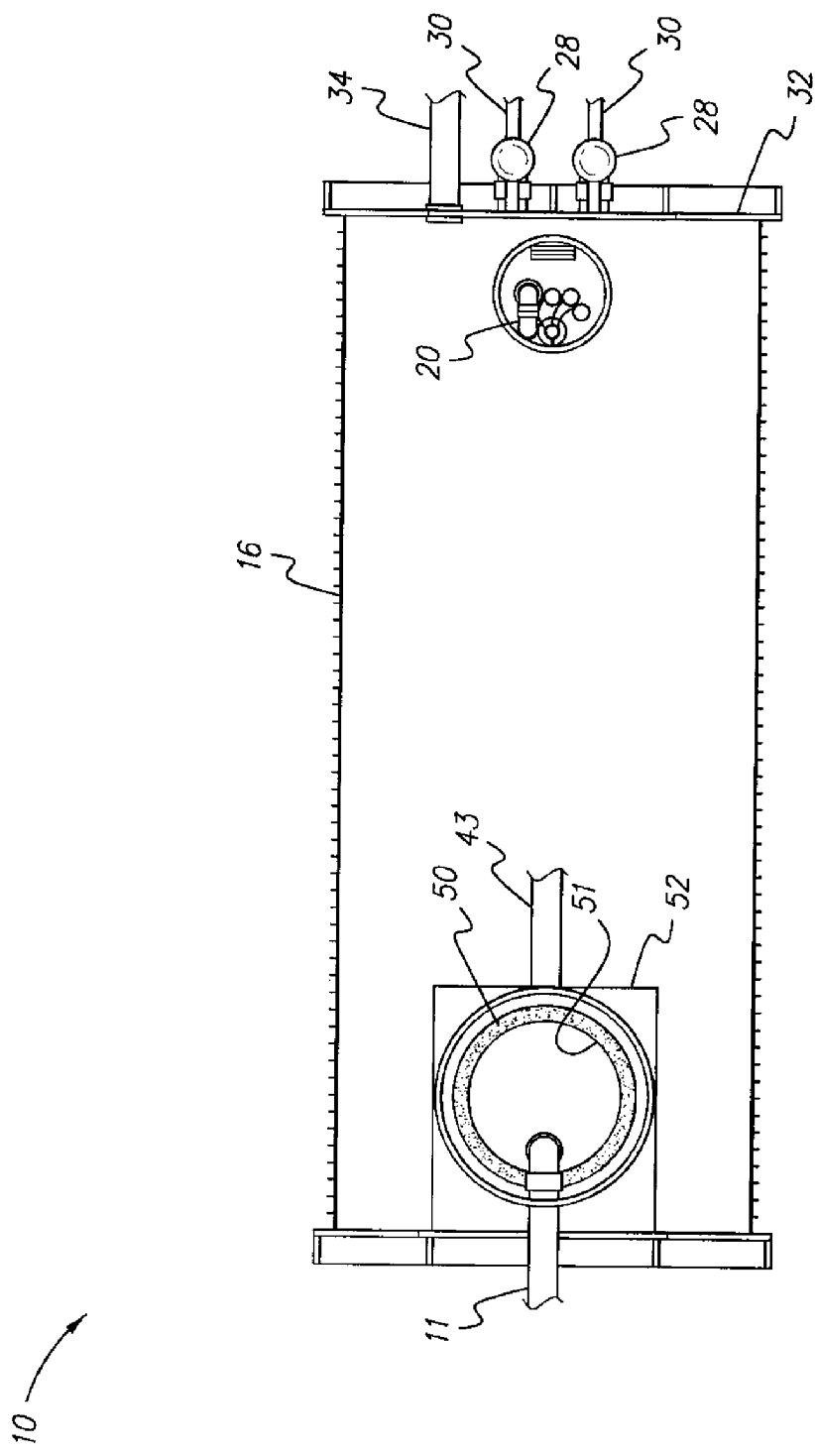
FIG. 2 is a plan view of the steel-reinforced HDPE rain harvesting system according to the present invention.
Figure 4:
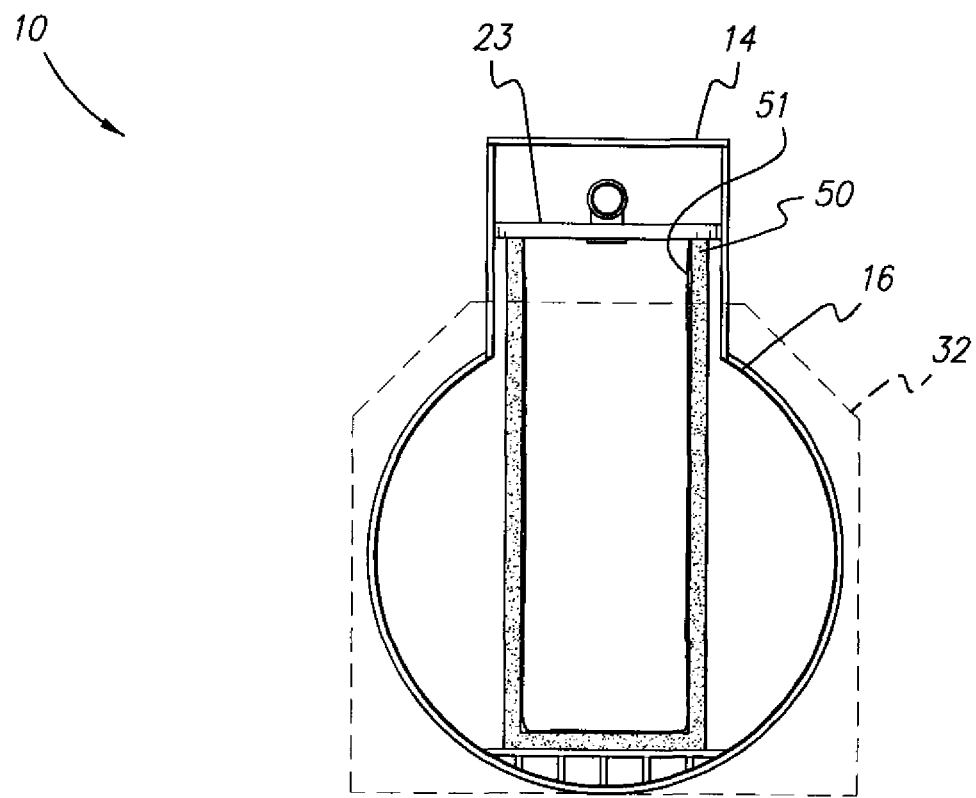
FIG. 4 is a section view of the steel-reinforced HDPE rain harvesting system according to the present invention, showing the filter portion.
Figure 5:
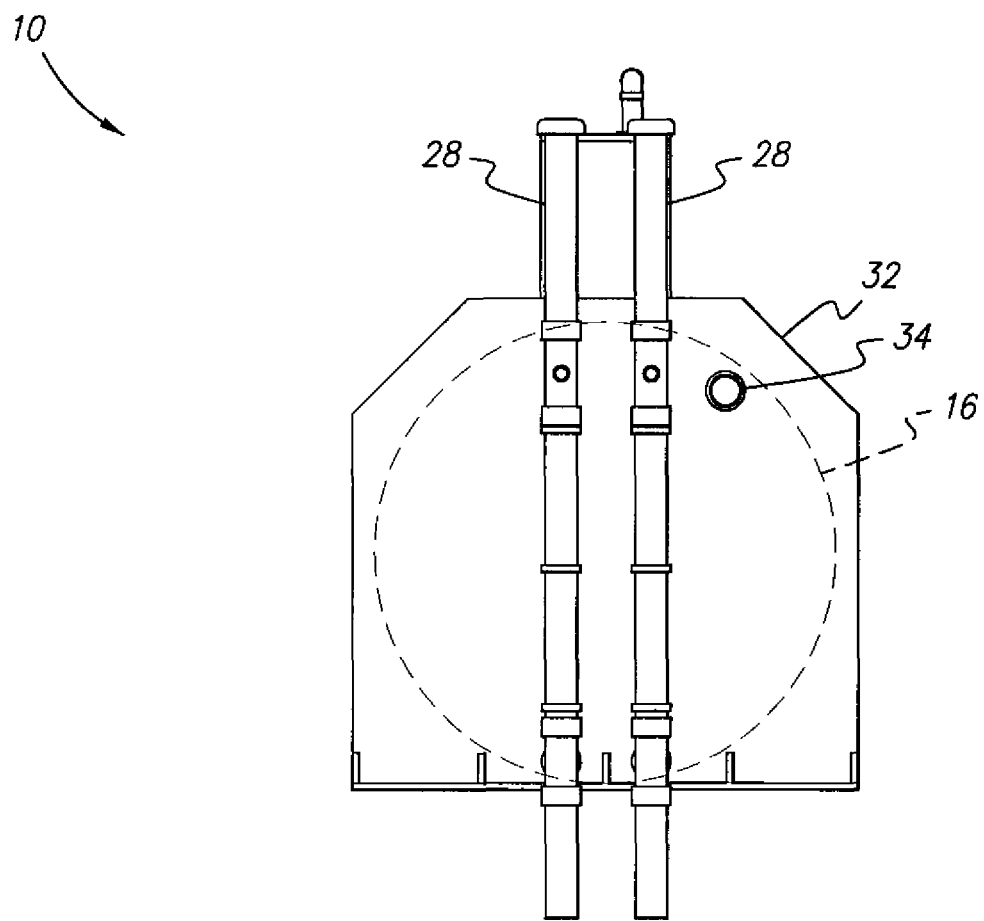
FIG. 5 is an end view of a steel-reinforced HDPE rain harvesting system according to the present invention configured as an irrigation wetwell assembly.

The steel-reinforced HDPE rain harvesting system 10 collects, stores, and pumps harvested rain water for a variety of non-portable and portable uses. As shown in FIGS. 1 and 4, the rain harvesting system 10 includes a steel-reinforced plastic cylindrical wetwell 16 connected to an inlet pipe 11. The wetwell 16 may be above or below grade, and either horizontally or vertically disposed. As shown in FIG. 2, the inlet pipe 11 is connected to a pervious concrete manhole 50 that maintains structural integrity of the rain filter 13. The concrete manhole 50 is preferably lined with a replaceable 20μ (micron) filter cloth 51 that, in conjunction with the pervious concrete structure 50, acts as a rain filter 13. The rain filter 13 allows rain water into the storage section of the wetwell 16. The concrete manhole structure 50 sits atop a platform 52 attached to the bottom of the wetwell 16. End plate bulkhead assemblies 32 seal both ends of the wetwell 16. The bottom portion of each end plate assembly 32 has a gusset plate 54 for stabilization of the unit 10.

Figure 3:
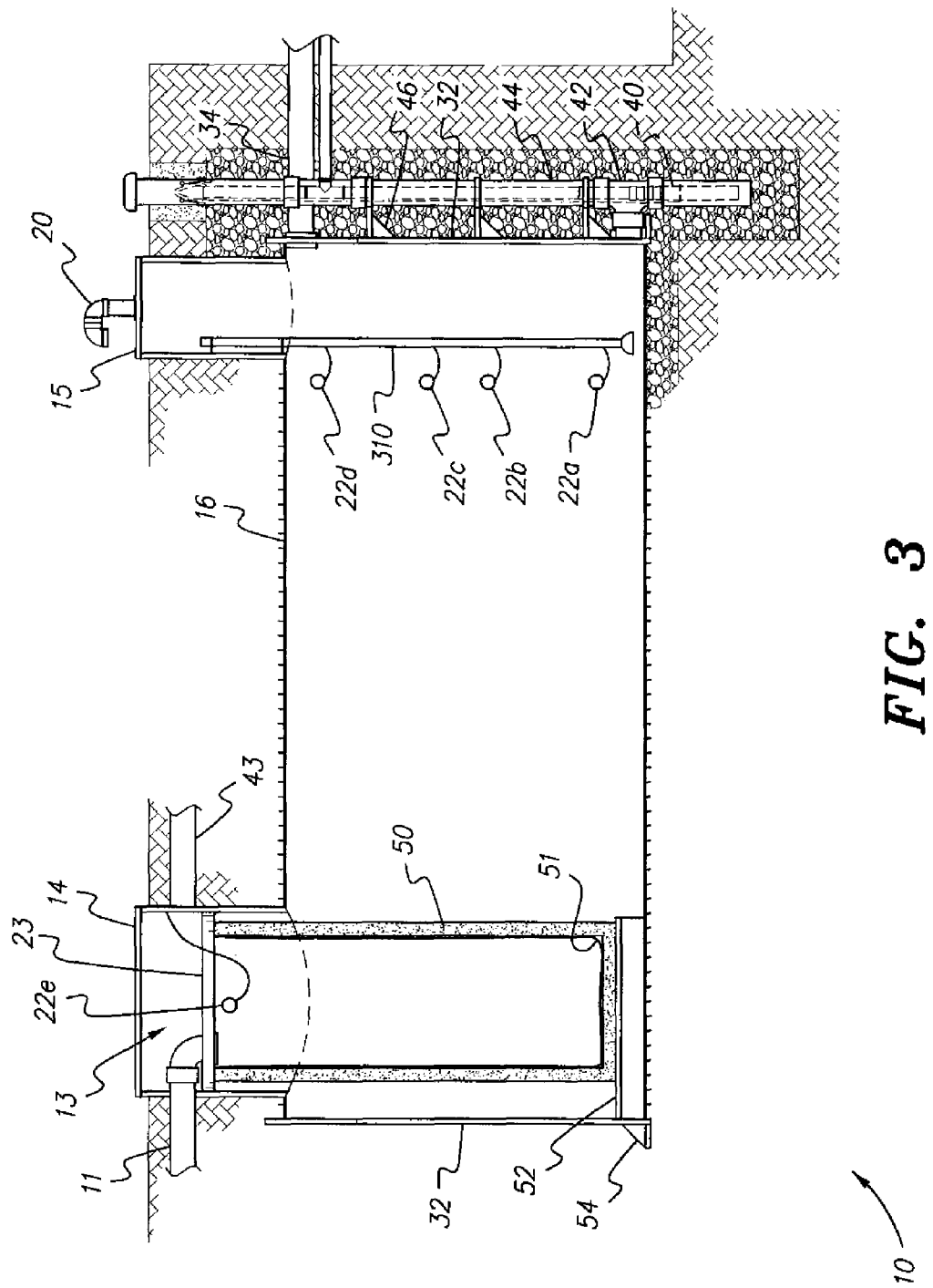
FIG. 3 is a side view of the steel-reinforced HDPE rain harvesting system according to the present invention.

As shown in FIG. 3, a high water alarm float 22e is disposed in the rain filter 13 and alerts maintenance personnel to clean the filter 13 when needed. FIG. 3 also shows a high water overflow port 34, which is provided to allow excess water in the wetwell 16 to overflow or discharge from the wetwell 16 in the event of failure of the pump 40 or water level float sensors 22a-22d and pressure transducer 310 assembly.

A submersible pump 40 is housed in an HDPE pump sleeve 44 outside the wetwell 16, and, via attachment to T connector 42, which extends from the interior of the wetwell 16, conveys effluent from a forcemain 30 at the wetwell's bottom portion to a desired target area. A water level monitoring system, comprising floats 22a-22d and a pressure transducer conduit 310, is disposed inside the wetwell 16 and selectively activates the pumping system. A slide rail assembly may be included to facilitate the installation and removal of pumps 40. Access hatches 14 and 15 in the top of the wetwell provide access to the rain filter and level monitoring system components. An air vent 20 extends from the access hatch 15. As shown in FIG. 1, a filter side high water overflow port 43 extends from the cylindrical riser supporting the access hatch 14 to permit excess water to flow out of the filter 13 through the overflow port 43 in the event the filter 13 becomes blocked. A substantially waterproof, resilient annular seal 23 is disposed between the inner wall of the supporting riser of the access hatch 14 and the outer wall of the pervious concrete manhole structure 50. The annular seal 23 aids in keeping filter overflow water from entering the tank 15. Instead of entering the tank 15, filter overflow water is allowed to escape the system 10 through the filter side high water overflow port 43. Preferably, the annular seal 23 is constructed from a thermoplastic material, and the riser supporting access hatch 14 is constructed from a thermoplastic material. HDPE, as well as other suitable thermoplastics, is a candidate material for construction of both of these structures.

During operation of the rain harvesting system 10, a rooftop drain system channels water into the inlet pipe 11, which directs the water into the rain filter assembly 13, where the water is filtered through the 20μ filter cloth and allowed to permeate through the pervious concrete manhole structure 13 into the wetwell storage basin 16. The level monitoring system, comprising floats 22a-22d and the pressure transducer conduit 310, allows water to rise to a first predetermined level inside the wetwell 16. Once the water has risen to the first predetermined level, the level monitoring system signals an external pump control panel to activate the external irrigation pump 40. The pump 40 then pumps and discharges the well water through pipes 28 and 30, the pipes 30 being connected to an external water receiving system. The water level decreases due to action of the pump 40. The level monitoring system sends a signal to the external pump control panel, which deactivates the pump 40 when the water level decreases to a second predetermined level. The operation repeats itself as needed, based upon water inflow into the wetwell 16 and external demand for the recycled rain water. In the event of failure of the pump 40 or the water level monitoring system components 22a-22d, 310, or in case the pump 40 cannot keep pace with the inflow of rain water, excess water in the wetwell 16 overflows through the wetwell 16 overflow port 34.

Additionally, the rain filter system can be maintained by accessing the filter 13 via a top lid 14 for visual inspection inside. Moreover, the high water alarm float 22e or sensor can cause an inspection alarm to be activated should the water level inside the filter system 13 get too high, indicating that the filter 13 needs to be cleaned. If visual inspection or the high water alarm indicate that the filter 13 is dirty, then the filter 13 can be manually removed and either cleaned and returned to service or completely replaced with a new 20-micron filter cloth 51. The filter cloth 51 is manufactured from high-tensile man-made fiber materials, which are readily available and easily shaped and formed to make a filter cloth insert or sock. The filter cloth 51 is manually reinstalled and affixed to the pervious manhole filter 50 using a bungee strap, large stainless steel hose clamp, nylon ratchet strap or other such attachment devices.

The pervious manhole 50 forms the water filtering structure 13 that supports the 20-micron filter cloth 51. The pervious manhole 50 is manufactured from porous concrete that allows large volumes of water to pass through. Porous concrete is inert and strong, and serves as an excellent device to house the 20-micron filter cloth 51. The pervious manhole 50 can be manufactured in different diameters and heights to provide enhanced flexibility of the overall design and functionality of the rain water harvesting system 10.

The rain water harvesting system 10 can be further equipped with disinfection technologies, such as chlorination or ultraviolet light systems that pre-treat the rain water or storm water so that the water may be further utilized for portable (drinking water) purposes. This would be a functionality suitable for developing countries lacking modern water treatment and distribution systems.

The steel-reinforced material permits the fabrication of lightweight but rugged wetwells that are easily fabricated, easily transported, and easily installed at the project site. The pumps 40 are simple submersible electric pumps housed in an exterior pump sleeve 44 or pump station basin. The pump sleeve 44 or pump station basin is part of the package, and is connected to the wetwell 16 in the field by way of threaded couplings welded into the wetwell 16. The sleeve 44 is further supported for its full height by HDPE support brackets 46 thermally fuse welded to the exterior of the wetwell 16. The rain water harvesting system 10 will reflect a very long service life, given the fact that the steel-reinforced materials are corrosion-resistant and protected in a buried installation. The wetwell 16 and plastic components have an expected service life of over seventy-five years.

The use of the pre-assembled, steel-reinforced HDPE rain water harvesting system 10 offers increased flexibility in the design and operation of civil infrastructure projects.

It is to be understood that the present invention is not limited to the embodiments described above, but encompasses any and all embodiments within the scope of the following claims.

We claim:

1. A steel-reinforced high-density polyethylene (HDPE) rain harvesting system, comprising:
   a cylindrical wetwell fabricated from steel-reinforced plastic;
   an HDPE filter platform disposed inside the wetwell;
   a pervious concrete manhole structure attached to and supported by the HDPE filter platform inside the wetwell;
   a replaceable filter cloth lining the pervious concrete manhole structure;
   an HDPE sleeve mounted outside of the wetwell;
   a pump disposed in the HDPE sleeve;
   a Tee connector having a leg connected to the pump and extending through the wetwell and axially, the Tee connector having aligned legs exterior to the wetwell;
   an effluent pipe attached to the axially aligned legs of the Tee connector outside the wetwell, the effluent pipe allowing effluent water to be pumped to a target location;
   an effluent HDPE riser assembly, the riser assembly including an access hatch, the effluent HDPE riser assembly extending upward from an upper surface opening proximate an effluent end of the wetwell;
   an inlet pipe extending into the wetwell, the inlet pipe being adapted for receiving rain water, the inlet pipe providing for entry of the rain water inside the pervious concrete manhole structure of the wetwell; and
   a first water level monitor disposed in the wetwell, the first water level monitor being connected to the pump for activating the pump when water level in the wetwell exceeds a first predetermined level and deactivating the pump when water level in the wetwell falls below a second predetermined level.

2. The steel-reinforced HDPE rain harvesting system according to claim 1, further comprising an influent HDPE riser assembly having an access hatch, the influent HDPE riser assembly extending upward from an upper surface opening proximate an influent end of the wetwell.

3. The steel-reinforced HDPE rain harvesting system according to claim 1, wherein said first water level monitor further comprises:
   a pressure transducer having an elongate conduit extending from an upper portion to a lower portion of the interior of said wetwell, the transducer conduit being attached to an inside wall of said effluent HDPE riser assembly; and
   water level float sensors attached to the elongate pressure transducer conduit, each of said water level float sensors being attached at its own predetermined displacement along the elongate pressure transducer conduit.

4. The steel-reinforced HDPE rain harvesting system according to claim 1, further comprising a vent extending upward from a top portion of said effluent HDPE riser assembly, the vent providing fresh air ventilation to said wetwell.

5. The steel-reinforced HDPE rain harvesting system according to claim 1, further comprising a high water overflow port extending from said wetwell, the overflow port being located proximate a top portion of said wetwell to allow gravity discharge of excess rain water from said wetwell to an external location.

6. The steel-reinforced HDPE rain harvesting system according to claim 1, further comprising a second water level monitor disposed in said wetwell, the second water level monitor being adapted for activating an alarm when water level in said pervious concrete manhole structure exceeds a third predetermined level.

7. The steel-reinforced HDPE rain harvesting system according to claim 6, wherein said second water level monitor further comprises a water level float sensor disposed in said pervious concrete manhole structure and secured to an inside wall of said influent HDPE riser assembly.

8. The steel-reinforced HDPE rain harvesting system according to claim 1, further comprising first and second bulkheads attached to respective axial ends of said cylindrical wetwell.

9. The steel-reinforced HDPE rain harvesting system according to claim 8, wherein each of said bulkheads further comprises a reinforcement gusset plate laterally extending along a bottom portion thereof.

10. The steel-reinforced HDPE rain harvesting system according to claim 8, further comprising a plurality of HDPE support brackets thermally fuse-welded to said second bulkhead, the HDPE support brackets securing the HDPE sleeve mounting outside of said wetwell.

11. A steel-reinforced high-density polyethylene (HDPE) rain harvesting system, comprising:
    a cylindrical wetwell fabricated from steel-reinforced plastic;
    a filter platform disposed inside the wetwell;
    a pervious concrete manhole structure attached to and supported by the filter platform inside the wetwell;
    a replaceable filter cloth lining the pervious concrete manhole structure;
    a corrosion resistant sleeve mounted outside of the wetwell;
    a pump disposed in the corrosion resistant sleeve;
    a Tee connector having a leg connected to the pump and extending through the wetwell and having aligned legs exterior to the wetwell;
    an effluent pipe attached to the axially aligned legs of the Tee connector outside the wetwell, the effluent pipe allowing effluent water to be pumped to a target location;
    an effluent riser assembly having an access hatch, the effluent riser assembly extending upward from the wetwell;
    an inlet pipe extending into the wetwell, the inlet pipe being adapted for receiving rain water, the inlet pipe providing a conduit for entry of the rain water into the pervious concrete manhole structure of the wetwell, the rain water filtering through the filter cloth and the manhole structure into the wetwell; and
    a first water level monitor disposed in the wetwell, the first water level monitor being connected to the pump and operable to activate the pump when water level in the wetwell exceeds a first predetermined level and deactivating the pump when water level in the wetwell falls below a second predetermined level.

12. The steel-reinforced HDPE rain harvesting system according to claim 11, further comprising an influent corrosion resistant riser assembly having an access hatch, the influent riser assembly extending upward from the wetwell, the pervious concrete manhole structure extending into the influent riser assembly.

13. The steel-reinforced HDPE rain harvesting system according to claim 12, further comprising a substantially waterproof, resilient annular seal disposed between said pervious concrete manhole structure and said influent riser assembly.

14. The steel-reinforced HDPE rain harvesting system according to claim 12, further comprising a filter side high water overflow port extending from said influent riser assembly to permit overflow of excess rain water when the rain water backs up inside said filter cloth and said pervious concrete manhole structure.

15. The steel-reinforced HDPE rain harvesting system according to claim 12, further comprising a second water level monitor disposed in said wetwell, the second water level monitor being adapted for activating an alarm when water level in said pervious concrete manhole structure exceeds a predetermined level to alert maintenance personnel to clean said filter cloth.

16. The steel-reinforced HDPE rain harvesting system according to claim 12, further comprising first and second bulkheads attached to opposing ends of said cylindrical wetwell.

17. The steel-reinforced HDPE rain harvesting system according to claim 16, wherein each of said bulkheads further comprises a reinforcement gusset plate laterally extending along a bottom portion thereof.

18. The steel-reinforced HDPE rain harvesting system according to claim 16, further comprising a plurality of HDPE support brackets thermally fuse-welded to said second bulkhead, the HDPE support brackets securing the corrosion resistant sleeve mounting outside of said wetwell.

* * * * *